United States Patent
Yasuda

(10) Patent No.: US 11,810,273 B2
(45) Date of Patent: Nov. 7, 2023

(54) IMAGE PROCESSING METHOD, IMAGE PROCESSING APPARATUS AND IMAGING APPARATUS

(71) Applicant: SCREEN HOLDINGS CO., LTD., Kyoto (JP)

(72) Inventor: Takuya Yasuda, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 150 days.

(21) Appl. No.: 17/463,134

(22) Filed: Aug. 31, 2021

(65) Prior Publication Data

US 2022/0092743 A1   Mar. 24, 2022

(30) Foreign Application Priority Data

Sep. 18, 2020   (JP) .................................. 2020-157369

(51) Int. Cl.
*G06T 5/00* (2006.01)
*G06T 5/50* (2006.01)

(52) U.S. Cl.
CPC ............... *G06T 5/003* (2013.01); *G06T 5/50* (2013.01); *G06T 2207/30024* (2013.01); *G06T 2207/30072* (2013.01)

(58) Field of Classification Search
CPC . G06T 5/003; G06T 5/50; G06T 2207/30024; G06T 2207/30072; G06T 2207/10056; G06T 2207/10148; G06T 2207/20221
USPC ....................................................... 382/255
See application file for complete search history.

(56) References Cited

U.S. PATENT DOCUMENTS

| | | | |
|---|---|---|---|
| 2017/0213325 A1* | 7/2017 | Wang | G06T 5/20 |
| 2020/0098094 A1* | 3/2020 | Yasuda | G02B 7/38 |
| 2020/0106944 A1* | 4/2020 | Sytnik | H04N 23/743 |
| 2021/0183034 A1* | 6/2021 | Chang | G02B 21/367 |
| 2021/0195079 A1 | 6/2021 | Yasuda | |

FOREIGN PATENT DOCUMENTS

| | | | | |
|---|---|---|---|---|
| JP | 2018-019319 A | | 2/2018 | |
| JP | 2018019319 A | * | 2/2018 | |
| JP | 6301416 B2 | | 3/2018 | |
| WO | WO-2018042786 A1 | * | 3/2018 | ............. G02B 21/36 |

OTHER PUBLICATIONS

Extended European Search Report issued in corresponding European Search Report No. 21192107.7-1210, dated Mar. 3, 2022.

\* cited by examiner

*Primary Examiner* — Matthew C Bella
*Assistant Examiner* — Pardis Sohraby
(74) *Attorney, Agent, or Firm* — McDermott Will & Emery LLP

(57) ABSTRACT

Sharpness at each focus position is calculated as an individual sharpness. Thereafter, one or M (where M is a natural number equal to or greater than 2 and smaller than N) corrective sharpness are calculated and image reference values are determined from the individual sharpness. An luminance value is calculated based on the image reference values and the corrective sharpness for each pixel. An all-in-focus image is generated by combining those luminance values.

7 Claims, 10 Drawing Sheets

FIG. 7

INDIVIDUAL SHARPNESS

| 50 | 70 | 50 | 0 |
|----|-----|----|---|
| 70 | 100 | 70 | 0 |
| 50 | 70  | 45 | 0 |
| 0  | 0   | 0  | 0 |

| 15 | 30 | 15 | 0 |
|----|----|----|---|
| 30 | 60 | 30 | 0 |
| 15 | 30 | 15 | 0 |
| 0  | 0  | 0  | 0 |

| 5  | 10 | 15 | 2 |
|----|----|----|---|
| 10 | 30 | 30 | 5 |
| 5  | 10 | 30 | 8 |
| 2  | 2  | 5  | 2 |

| 0 | 5  | 5  | 1  |
|---|----|----|----|
| 0 | 15 | 50 | 15 |
| 0 | 10 | 20 | 5  |
| 1 | 1  | 3  | 1  |

| 0 | 10 | 30 | 0  |
|---|----|----|----|
| 0 | 50 | 80 | 50 |
| 0 | 35 | 50 | 10 |
| 0 | 0  | 0  | 0  |

CORRECTIVE SHARPNESS (TOP TWO)

S(0,x,y)

| 50 | 70  | 50 | 2  |
|----|-----|----|----|
| 70 | 100 | 80 | 50 |
| 50 | 70  | 50 | 10 |
| 2  | 2   | 5  | 2  |

| 15 | 30 | 30 | 1  |
|----|----|----|----|
| 30 | 60 | 70 | 15 |
| 15 | 35 | 45 | 5  |
| 1  | 1  | 3  | 1  |

S(1,x,y)

IMAGE REFERENCE VALUE

A(0,x,y)

| 0 | 0 | 0 | 2 |
|---|---|---|---|
| 0 | 0 | 4 | 4 |
| 0 | 0 | 4 | 4 |
| 2 | 2 | 3 | 2 |

| 1 | 1 | 4 | 3 |
|---|---|---|---|
| 1 | 1 | 0 | 3 |
| 1 | 4 | 0 | 3 |
| 3 | 3 | 3 | 3 |

IMAGE PROCESSING METHOD, IMAGE PROCESSING APPARATUS AND IMAGING APPARATUS

CROSS REFERENCE TO RELATED APPLICATION

The disclosure of Japanese Patent Application No. 2020-157369 filed on Sep. 18, 2020 including specification, drawings and claims is incorporated herein by reference in its entirety.

BACKGROUND OF THE INVENTION

1. Field of the Invention

This invention relates to an image processing method, an image processing apparatus and an imaging apparatus for generating an all-in-focus image based on a plurality of captured images.

2. Description of the Related Art

An image obtained by imaging a specimen containing cells may be used to culture and analyze the cells. The specimen is prepared using a flat plate-like container with a plurality of wells (recesses) called a well plate, microplate or the like or a flat dish-like container called a dish having a single well. Cells to be imaged are held together with a culture solution in the well(s). In recording such a specimen containing the cells as an image, imaging is performed a plurality of times with a focus position changed in a depth direction and an all-in-focus image is generated by synthesizing a plurality of obtained images since the cells are distributed to various depths in the solution.

For example, a technique described in JP 6301416B1 previously disclosed by the applicant of this application is a technique for generating an all-in-focus image from a plurality of images imaged while a focus position was changed. This technique generates an all-in-focus image that does not give a sense of discomfort in a spatial direction by adding a weighting calculation based on a spatial distance and sharpness to the composition method using the pixel reference value indicating the all-in-focus position.

SUMMARY OF THE INVENTION

In the well, a plurality of cells are distributed in a complicated manner. That is, two cells may be largely separated in a height direction, but may overlap in a plan view. In this case, if the above technique is used, there has been a problem that a cell as a target of an image reference value is more weighted since one image reference value is used for one pixel and a part overlapping another cell is missing as shown in a left lower part of FIG. 3 to be described later.

This invention was developed in view of the above problem and aims to provide an image processing method, an image processing apparatus and an imaging apparatus capable of generating an all-in-focus image in which each object is vividly reflected even if a plurality of objects are distributed in a complicated manner.

A first aspect of the invention is an image processing method for generating an all-in-focus image based on a plurality of captured images, comprising: (a) obtaining N (where N is a natural number equal to or greater than 2) captured images each constituted by a plurality of pixels by imaging an object while a focus position is changed in N stages along an optical axis; (b) obtaining one or M (where M is a natural number equal to or greater than 2 and smaller than N) image reference values and corrective sharpness for each pixel, the image reference value being a number of the captured image to be referred to as a luminance value of each set of coordinates of the all-in-focus image; (c) calculating the luminance value based on the image reference values and the corrective sharpness for each set of coordinates; and (d) generating the all-in-focus image by combining the calculated luminance values, the operation (b) including: (b-1) obtaining N individual sharpnesses by calculating a sharpness at each focus position; and (b-2) obtaining the corrective sharpness and the image reference value from the N individual sharpnesses.

A second aspect of the invention is an image processing apparatus for generating an all-in-focus image based on a plurality of captured images, comprising: an image storage configured to store captured images each constituted by a plurality of pixels and obtained by imaging an object while changing a focus position in N (where N is a natural number equal to or greater than 2) stages along an optical axis; a sharpness calculator configured to calculate N individual sharpnesses by calculating a sharpness at each focus position and calculating one or M (where M is a natural number equal to or greater than 2 and smaller than N) corrective sharpnesses from the N individual sharpnesses; an image reference value determiner configured to determine an image reference value in correspondence with the corrective sharpness, the image reference value being a number of the captured image to be referred to as a luminance value of each set of coordinates of the all-in-focus image; a luminance value calculator configured to calculate the luminance value based on the image reference value and the corrective sharpness for each set of coordinates; and an all-in-focus image generator configured to generate the all-in-focus image by combining the calculated luminance values.

A third aspect of the invention is an imaging apparatus, comprising: the image processing apparatus; an imager configured to image the object; an illuminator configured to emit light toward the object; and a moving mechanism configured to change the focus position of the imager along the optical axis.

In the invention thus configured, after the sharpness at each focus position is calculated as the individual sharpness, one or M (where M is a natural number equal to or greater than 2 and smaller than N) corrective sharpnesses are calculated and the image reference values are determined from the individual sharpnesses. Then, the luminance value is calculated based on the image reference values and the corrective sharpnesses for each pixel and an all-in-focus image is generated by combining those luminance values.

As described above, according to the invention, the all-in-focus image in which each object is vividly reflected can be generated even if a plurality of objects are distributed in a complicated manner.

All of a plurality of constituent elements of each aspect of the invention described above are not essential and some of the plurality of constituent elements can be appropriately changed, deleted, replaced by other new constituent elements or have limited contents partially deleted in order to solve some or all of the aforementioned problems or to achieve some or all of effects described in this specification. Further, some or all of technical features included in one aspect of the invention described above can be combined with some or all of technical features included in another aspect of the invention described above to obtain one

BRIEF DESCRIPTION OF THE DRAWINGS

FIG. 7 is a chart showing an example of the processing content realized by the arithmetic processor.

FIG. 10 is a chart showing an image processing method performed in the fourth embodiment of the image processing apparatus of the invention.

DETAILED DESCRIPTION OF THE PREFERRED EMBODIMENT

Hereinafter, a preferred embodiment of the invention is described with reference to the drawings. In the following description, an "image processing apparatus" of the invention is an imaging apparatus for imaging a well plate. It is described that an "image processing method" of the invention is executed in the imaging apparatus.

Figure 1:
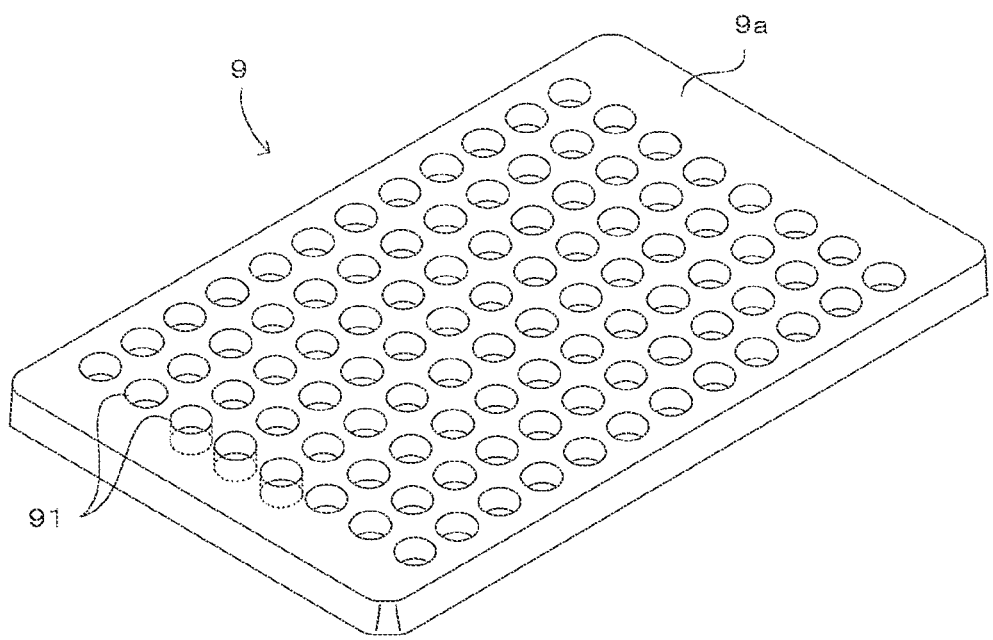
FIG. 1 is a diagram showing an example of a well plate used in the invention.

FIG. 1 is a diagram showing an example of a well plate used in the invention. Specifically, FIG. 1 is a perspective view of the well plate 9. The well plate 9 is a substantially plate-like specimen container including a plurality of wells 91. A transparent resin which transmits visible light is, for example, used as a material of the well plate 9. The plurality of wells 91 are regularly arranged in the upper surface of the well plate 9. The wells 91 hold a plurality of cells serving as an imaging object together with a culture medium. In this embodiment, the wells 91 are described to have a circular shape in a top view. However, the wells 91 may have another shape such as a rectangular shape or a rounded rectangular shape. Here, XYZ orthogonal coordinate axes are set as directions in FIG. 1. For example, the XY plane can be considered as a horizontal plane and the Z axis as a vertical axis. In the following, the (−Z) direction is vertically downward.

Figure 2:
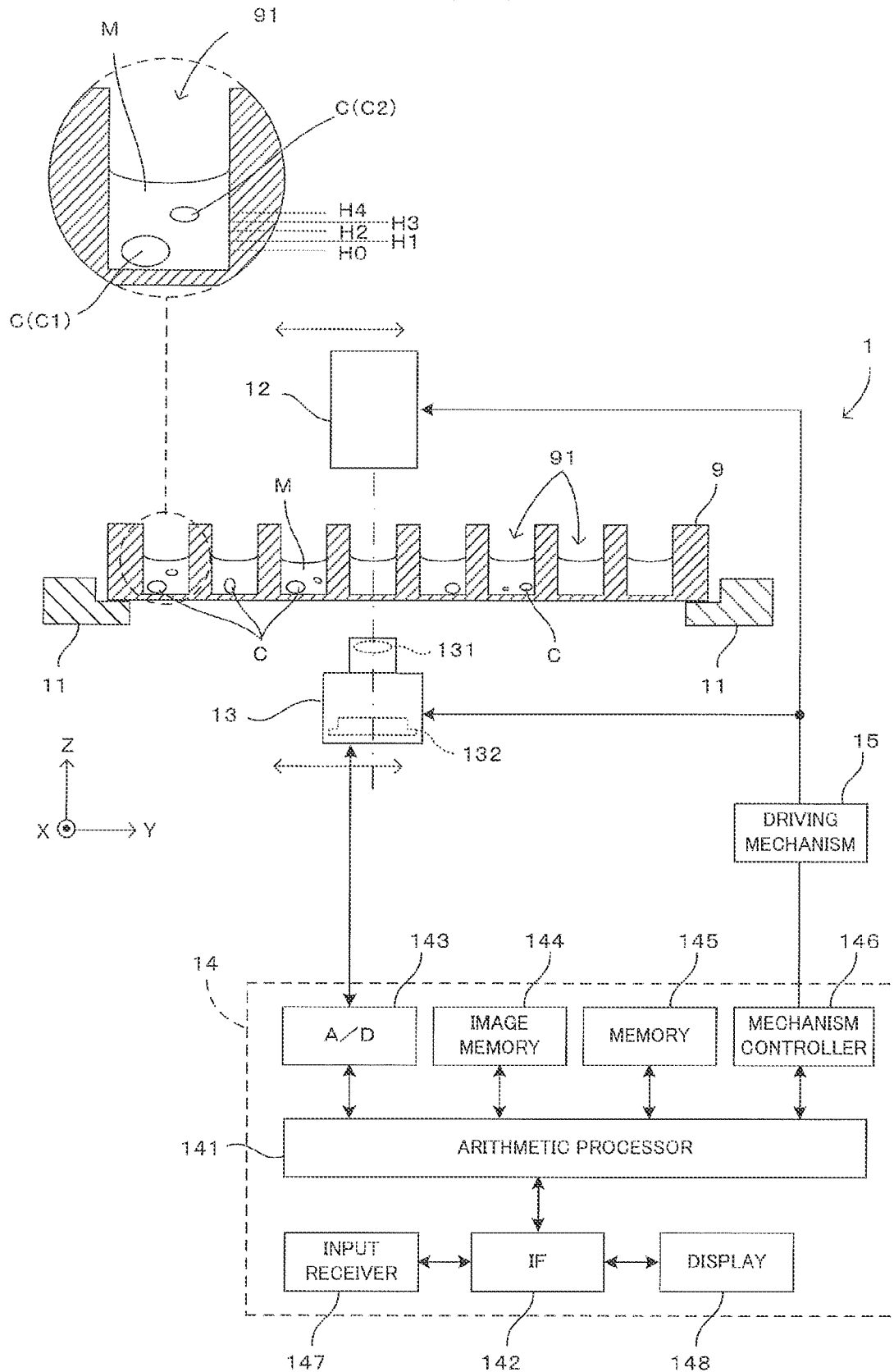
FIG. 2 is a diagram showing a schematic configuration of the imaging apparatus according to the invention.

FIG. 2 is a diagram showing a schematic configuration of the imaging apparatus according to the invention. This imaging apparatus 1 is an apparatus for imaging a living specimen such as cells, cell colonies and bacteria (hereinafter, referred to as "cells and the like" and denoted by C) as an object of the invention cultured in the culture medium carried in recesses called the wells 91 formed in the upper surface of the well plate 9. Note that the size of the well plate and the number of the wells to be imaged by this imaging apparatus 1 are not limited to these and are arbitrary. For example, well plates having 6 to 384 holes are generally used. Further, this imaging apparatus 1 can be used also in imaging cells and the like cultured, for example, in a flat container called a dish without being limited to use for well plates including a plurality of wells.

A predetermined amount of a liquid serving as a culture medium M is injected into each well 91 of the well plate 9, and the cells and the like C cultured under predetermined culture conditions in this liquid become an imaging object of this imaging apparatus 1. The culture medium may be added with an appropriate reagent or may be gelled after being injected in a liquid state into the wells 91. In this imaging apparatus 1, for example, cells and the like C cultured, on the inner bottom surfaces of the wells 91 can be imaged.

The imaging apparatus 1 includes a holder 11 which holds the well plate 9, an illuminator 12 arranged above the holder 11, an imager 13 arranged below the holder 11 and a controller 14 which includes an arithmetic processor 141 controlling the operation of these components. The holder 11 holds the well plate 9 in a substantially horizontal posture by being held in contact with a peripheral edge part of the lower surface of the well plate 9 carrying sample together with liquid in each well 91.

The illuminator 12 emits an illumination light toward the well plate 9 held by the holder 11. For example, a white LED (light emitting diode) may be used as a light source of the illumination light. A combination of the light source and an appropriate illumination optical system are used as the illuminator 12. The cells or the like in the well 91 disposed to the well plate 9 are illuminated by the illuminator 12 from above.

The imager 13 is provided below the well plate 9 held by the holder 11. In the imager 13, an imaging optical system is arranged at a position right below the well plate 9. An optical axis of the imaging optical system extends in a vertical direction. FIG. 2 shows a side view. A right and left direction of the figure indicates a horizontal direction and an up and down direction of the figure indicates a vertical direction.

The imaging of the cells or the like in the well 91 is performed by the imager 13. Specifically, light emitted from the illuminator 12 and incident on the surface of the liquid from above the well 91 illuminates the imaging object. Light transmitted downward from the bottom surface of the well 91 is incident to a light receiving surface of an imaging element 132 via the imaging optical system of the imager 13 including an objective lens 131. An image of the imaging object formed on the light receiving surface of the imaging element 132 by the imaging optical system is imaged by the imaging element 132. The imaging element 132 is an area image sensor having a two-dimensional light receiving surface. A CCD sensor or a CMOS sensor can be used as the imaging element 132.

The imager 13 is capable of moving in the horizontal direction and the vertical direction by a mechanism controller 146 provided in the controller 14. Specifically, the mechanism controller 146 moves the imager 13 in the horizontal direction by operating a drive mechanism 15 based on a control command from the arithmetic processor 141. By doing so, the imager 13 moves relative to the well 91 in the horizontal direction. Further, focusing is performed by moving the imager 13 in the vertical direction. When the imaging is performed in a state that a whole of the well 91 is included in a field of view, the mechanism controller 146 positions the imager 13 in the horizontal direction such that the optical axis of the imaging optical system coincides with the center of the well 91.

Further, the as indicated by arrows with dotted lines shown in FIG. 2, the driving mechanism 15 moves the illuminator 12 integrally with the imager 13 when the imager 13 is moved in the horizontal direction. Specifically, the illuminator 12 is arranged such that a center of emitted light substantially coincides with the optical axis of the imaging optical system. When the imager 13 moves in the horizontal direction, the illuminator 12 also moves in conjunction with the imager 13. By doing so, whichever well 91 is imaged, the center of the well W and the center of emitted light are always position on the optical axis of the imaging optical system. Consequently, the illuminating condition becomes constant regardless of which well 91 is to be imaged, wherefore imaging conditions can be maintained to be satisfactory.

The image signal output from the imaging element 132 of the imager 13 is send to the controller 14. The image signal is input to an AD converter (A/D) 143 provided in the controller 14 and converted into digital image data. The arithmetic processor 141 functions as an image processor which performs appropriate image processings based on the received image data. The controller 14 further includes an image memory 144 for storing image data functioning as image storage and a memory 145 for storing programs to be executed by the arithmetic processor 141 and data generated by the arithmetic processor 141, but these may be integrated. The arithmetic processor 141 performs variable calculation processings described later by executing a control program stored in the memory 145.

Besides, the controller 14 is provided with an interface (I/F) 142. The interface 142 has a function of receiving an operation input from a user and presenting information such as processing results to the user. The controller 14 also has a function of performing data exchange with an external apparatus connected via a communication line. To realize the user interface function, an input receiver 147 for receiving an operation input from the user and a display 148 for displaying the messages to the user, a processing result or the like are connected to the interface 142.

Note that the controller 14 may be an exclusive device including above hardware. Further, the controller 14 may be a general-purpose processing device such as a personal computer or a workstation installed with the control program for performing the process described later. Specifically, a general-purpose computer apparatus may be used as the controller 14 of the imaging apparatus 1. When a general-purpose processing device is used as the controller 14, the imaging apparatus 1 may have just a minimal control function for controlling each components of the imager 13 and the like.

Figure 3:
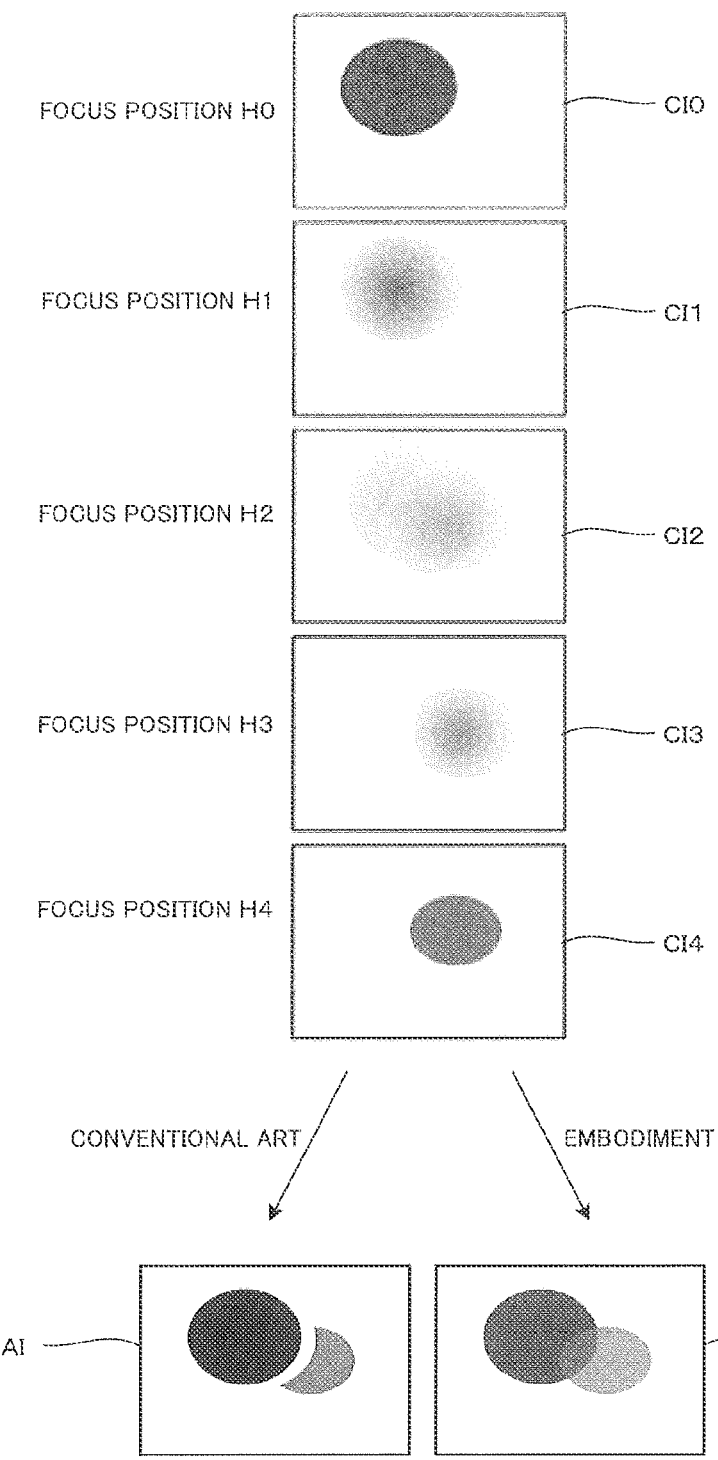
FIG. 3 shows diagrams schematically showing an all-in-focus image obtained by the conventional art and an all-in-focus image obtained by this embodiment.

FIG. 3 shows diagrams schematically showing an all-in-focus image obtained by the conventional art and an all-in-focus image obtained by this embodiment. For example, as shown in a partial enlarged view in FIG. 2, a plurality of cells C may be largely separated in a vertical direction (height direction) in the well 91, but overlap in a plan view. Here, it is assumed that two cells C are present in an imaging field of view of the imager 13 for the well 91 to be imaged. The cell C on a left side in the partial enlarged view is referred to as a first cell C1, and the cell C on a right side is referred to as a second cell C2. If the well 91 is imaged with a focus position of the imager 13 changed in N stages, e.g. in five stages, five captured images CI0 to CI4 are obtained, for example, as shown in an upper part of FIG. 3.

In an example of FIG. 3, the first cell C1 is best focused in the captured image CI0 at a focus position H0, and the second cell C2 is best focused in the captured image CI4 at a focus position H4. Further, the cells C1, C2 partially overlap in the captured image CI2 at a focus position H2.

If an all-in-focus image AI is generated by applying the technique described in JP 6301416B to the five captured images CI0 to CI4 obtained in this way, the following problem may occur. In the conventional art, a sharpness is calculated for each pixel for each of the captured images CI0 to CI4. By comparing the sharpnesses among the corresponding pixels of the captured images CI0 to CI4, an image reference value is determined for each set of coordinates. In this way, only one image reference value is determined for one pixel. Thus, the cell C1 serving as a target of the image reference value, out of two cells C1, C2 overlapping in the plan view, is more weighted. As a result, as shown in the left-lower part of FIG. 3, the missing of an overlapping part of the cells C1, C2 and the like may occur.

In contrast, in this embodiment, a plurality of image reference values are selected for each pixel and composition is performed on the basis of corrective sharpnesses as described in detail later. Thus, the all-in-focus image AI in which each cell C1, C2 is vividly reflected can be generated as shown in a right-lower part of FIG. 3. An image processing apparatus and an image processing method of a first embodiment according to the invention are described in detail below with reference to FIGS. 4 to 7.

Figure 4:
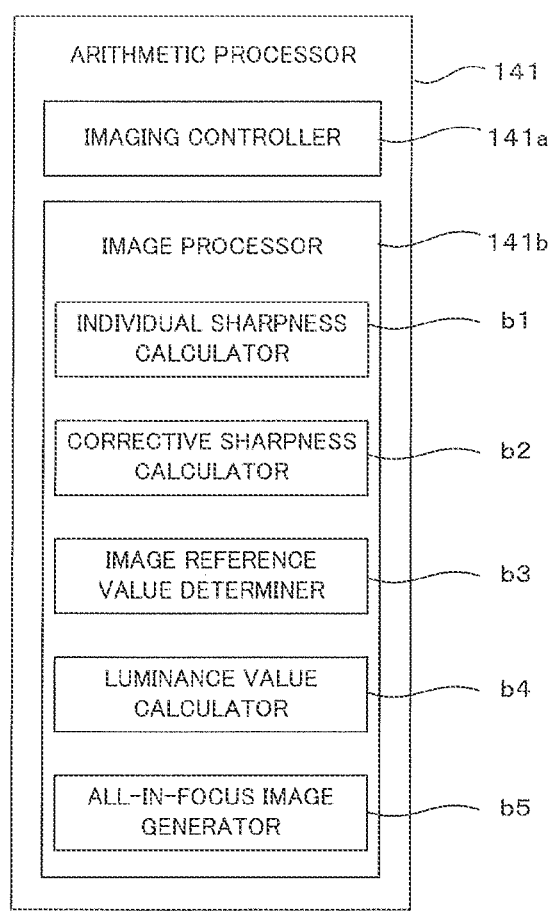
FIG. 4 is a block diagram conceptually showing functions realized by the arithmetic processor in the first embodiment of the image processing apparatus according to the invention.

FIG. 4 is a block diagram conceptually showing functions realized by the arithmetic processor in the first embodiment of the image processing apparatus according to the invention. The arithmetic processor 141 includes an imaging controller 141a and an image processor 141b. The imaging controller 141a controls the operation of the illuminator 12, the imager 13 and the driving mechanism 15 in accordance with a control program for imaging stored in the memory 145 in advance. In this way, the cells C held in the respective wells 91 of the well plate 9 are imaged and five captured images CI0 to CI14 are obtained for each well 91, for example, as shown in FIG. 3 and stored in the image memory 144. Note that since the imaging process is the same as the conventional art described in JP 6301416B, the imaging process is not described here.

Figure 5:
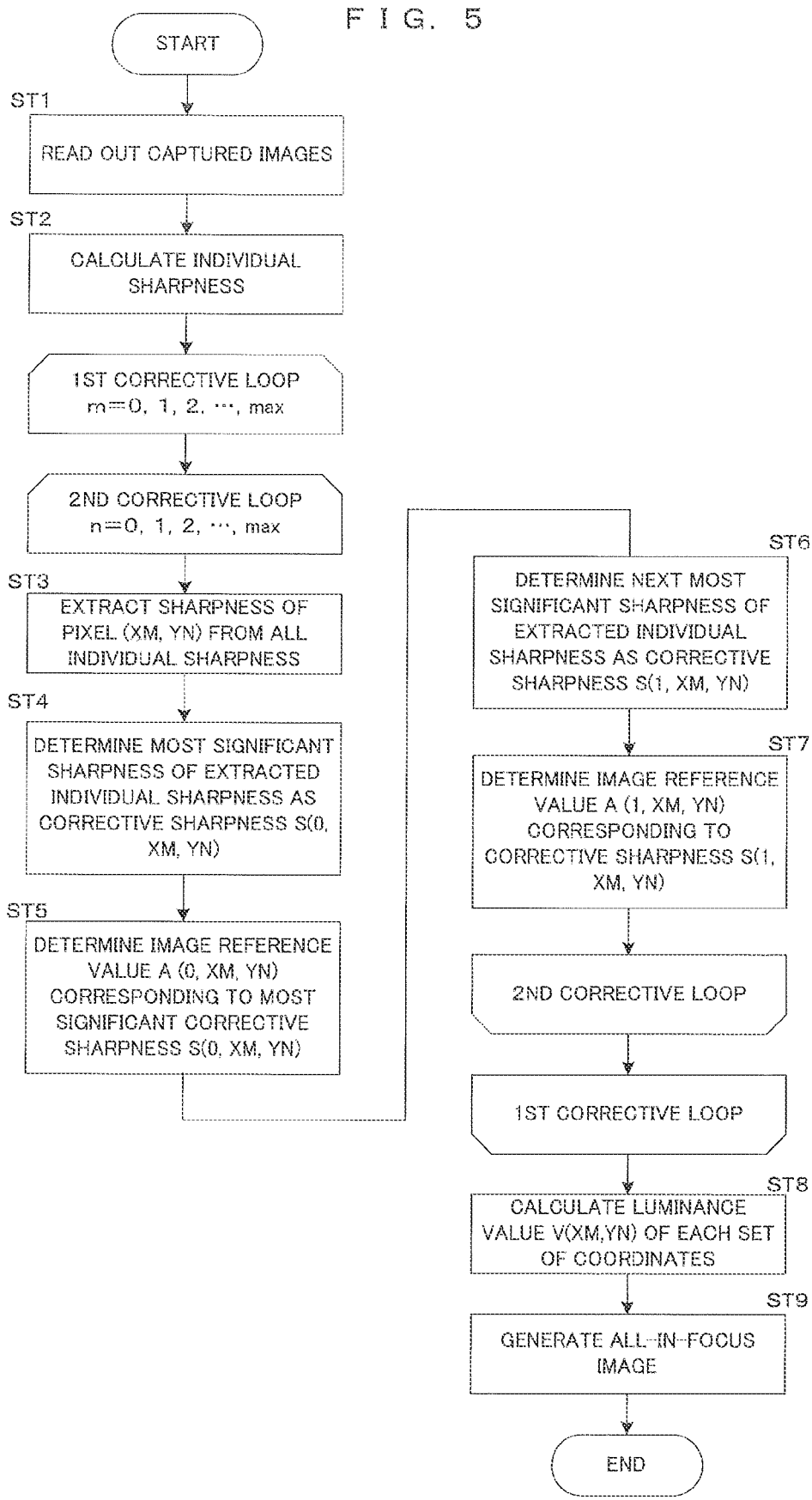
FIG. 5 is a flow chart showing a flow of the process realized by the arithmetic processor.

On the other hand, the imaging processor 141b performs an imaging process shown in FIG. 5 in accordance with a control program for image processing stored in the memory 145 in advance. That is, the imaging processor 141b includes:

an individual sharpness calculator b1 for calculating sharpnesses for each pixel, a corrective sharpness calculator b2 for calculating M corrective sharpnesses for each pixel, an image reference value determiner b3 for determining M image reference values, which are the numbers of the captured image CI0 to CI4 to be referred to as a luminance value of each set of coordinates of the all-in-focus image A1, for each pixel, a luminance value calculator b4 for calculating the luminance value based on the M image reference values and M corrective sharpnesses for each pixel, and an all-in-focus image generator b5 for generating the all-in-focus image AI by combining the calculated luminance values.

Specific processings performed by these components are as follows.

Figure 6:
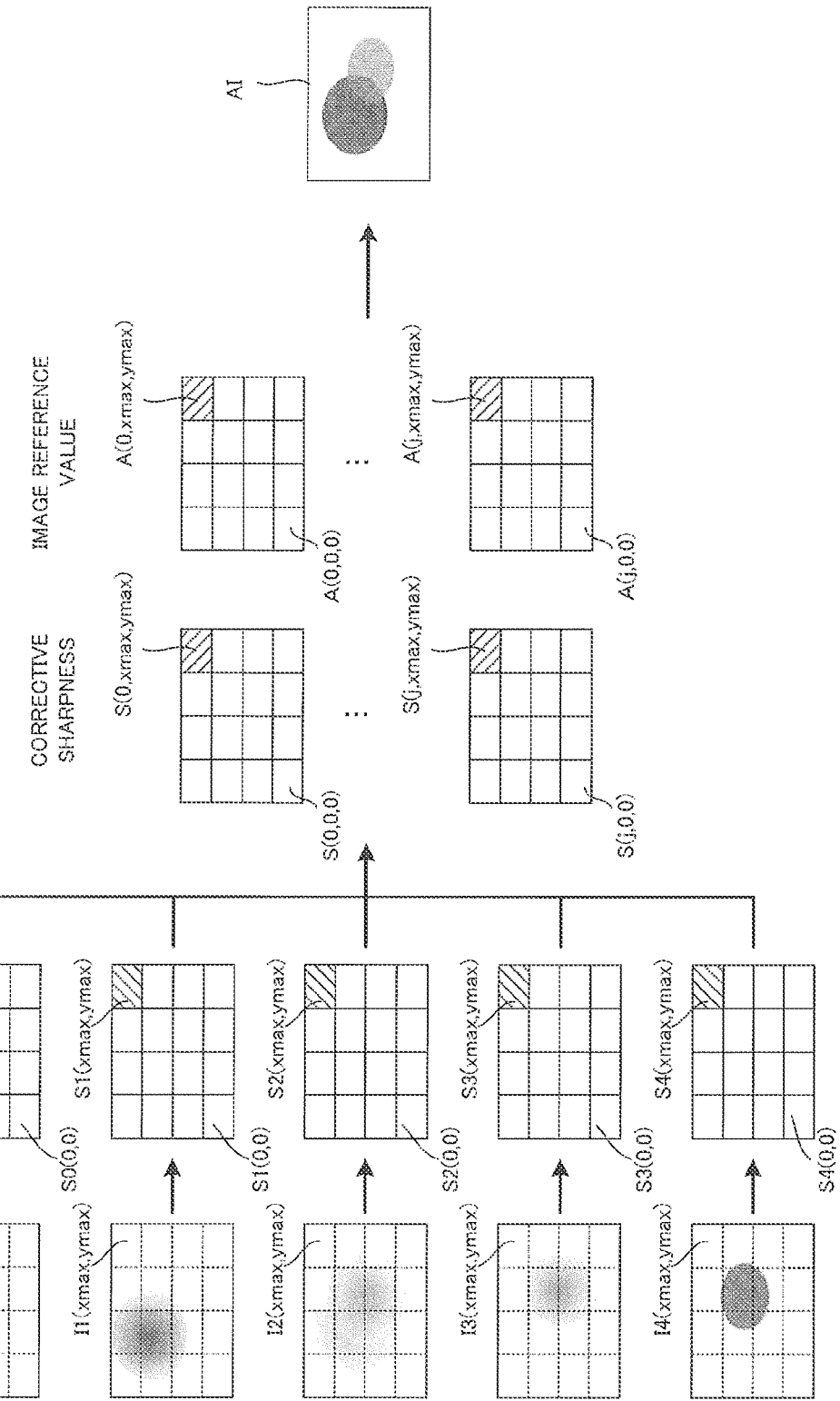
FIG. 6 is a chart showing processing contents realized by the arithmetic processor.

FIG. 5 is a flow chart showing a flow of the process realized by the arithmetic processor. FIG. 6 is a chart showing processing contents realized by the arithmetic processor. FIG. 7 is a chart showing an example of the processing content realized by the arithmetic processor.

The arithmetic processor 141 reads out the plurality of captured images CI0 to CI4 obtained by the imaging process described above from the image memory 144 (Step ST1). Subsequently, the individual sharpness calculator b1 of the arithmetic processor 141 calculates the individual sharpnesses for each pixel for each of the plurality of captured images CI0 to CI4 (Step S2). In particular, as shown in FIG. 6, the individual sharpnesses S0(0, 0) to S0(xmax, ymax) are calculated for each pixel constituting the captured image CI0. The same applies also to the other captured images CI1 to CI4. Note that dotted lines in FIG. 6 schematically show sections of the pixel. Further, the "individual sharpness" in this specification is an index indicating the sharpness of an image in and around the pixel similarly to a "sharpness" of the conventional art. In this embodiment, the individual sharpnesses S0(0, 0) to S0(xmax, ymax) are, for example, calculated based on a luminance change of the pixel in a certain region centered on the pixel. However, a variance value of luminances of surrounding pixels, a maximum value or a minimum value of luminances or the like may be used as the individual sharpness.

In the conventional art, the image reference value A is determined for each set of coordinates by comparing the sharpnesses among the corresponding pixels of the plurality of captured images CI0 to CI4. In contrast, in this embodiment, the corrective sharpness calculator b2 calculates the M corrective sharpnesses and the image reference value determiner b3 determines the M image reference values while each of an x coordinate and a y coordinate is changed from 0 to a maximum value max (Steps ST3 to ST7). In this embodiment, to facilitate the understanding of the invention contents, a case where the value M is fixed at "2" is illustrated in FIGS. 5 to 7. The calculation of the corrective sharpnesses and the determination of the image reference values are described below with reference to FIGS. 5 to 7.

In Step ST3, the corrective sharpness calculator b2 extracts the individual sharpnesses S0(xm, yn), S1(xm, yn), S2(xm, yn), S4(xm, yn) and S5(xm, yn) corresponding to a pixel (xm, yn) from all the individual sharpnesses calculated in Step ST2 as shown in FIGS. 5 and 6. Subsequent to that, the corrective sharpness calculator b2 determines the most significant sharpness of the extracted individual sharpnesses S0(xm, yn) to S4(xm, yn) as a corrective sharpness s(0, xm, yn) (Step ST4). Subsequent to that, the image reference value determiner b3 determines the image reference value A(0, xm, yn) corresponding to the most significant corrective sharpness s(0, xm, yn) (Step ST5). Here, description is continued, assuming that the individual sharpnesses shown in FIG. 7 are, for example, calculated in Step ST2 and the set of coordinates (xm, yn) serving as a calculation object of the corrective sharpnesses are a set of coordinates (1, 3). In this case, the corrective sharpness calculator b2 extracts,

S0(1,3)=70,

S1(1,3)=30,

S2(1,3)=10,

S3(1,3)=5, and

S4(1,3)=10.

Then, the corrective sharpness calculator b2 determines the individual sharpnesses0(1, 3) as the corrective sharpness s(0, 1, 3) and the image reference value determiner b3 determines the image reference value A(0, 1, 3) as "0".

When the most significant corrective sharpness s(0, xm, yn) and image reference value A(0, xm, yn) are obtained in this way, the corrective sharpness calculator b2 calculates the next most significant corrective sharpness s(1, xm, yn) (Step ST6). Further, the image reference value determiner b3 determines the image reference value A(1, xm, yn) corresponding to the corrective sharpness s(1, xm, yn) (Step ST7). Note that, for the above set of coordinates (1, 3), the corrective sharpness calculator b2 determines the next most significant corrective sharpness s(1, 1, 3) of the individual sharpness s1(1, 3) as "30" as shown in FIG. 7 and the image reference value determiner b3 determines the next most significant image reference value A(1, 1, 3) as "1".

Note that, in this embodiment, M=2 as described above, i.e. top two significant corrective sharpnesses S(0, x, y), S(1, x, y) are calculated and the image reference values A(0, x, y), A(1, x, y) corresponding to the calculated corrective sharpnesses are obtained for each pixel. However, the value of M is not limited to this and may be three or greater on the condition that M is in a range smaller than the number N of the focus positions.

Subsequently, the luminance value calculator b4 of the arithmetic processor 141 calculates a luminance value V of each set of coordinates constituting the all-in-focus image based on the plurality of image reference values A and the luminance values of the respective captured images CI0 to CI4 (Step ST8). That is, the luminance value V of this set of coordinates of the all-in-focus image is calculated by reflecting the luminance values of the captured images CI indicated by the image reference values A of the surrounding sets of coordinates on the luminance value of this set of coordinates of the captured image CI indicated by the image reference values A of each set of coordinates. Specifically, the luminance value calculator b4 calculates the luminance value V of each set of coordinates constituting the all-in-focus image, for example, using the following Equation (1).

[Equation 1]

$$V(xn, yn) = \frac{\sum_{k=-fx}^{fx} \sum_{l=-fy}^{fy} \sum_{m=0}^{M(x,y)} I(A(m, xn+k, yn+l), xn, yn) \, COE(k, l, m)}{\sum_{k=-fx}^{fx} \sum_{l=-fy}^{fy} \sum_{m=0}^{M(x,y)} COE(k, l, m)} \quad (1)$$

$$COE(k, l, m) = \exp\left(-\frac{k^2 + l^2}{2\sigma_d^2}\right) \exp\left(-\frac{(1 - S(m, xn+k, yn+l))^2}{2\sigma_s^2}\right)$$

Here, V(xn, yn) in Equation (1) indicates a luminance value (luminance value to be calculated) at a set of coordinates (xn, yn) in the all-in-focus image. In Equation (1), k, l respectively indicate distances in an x direction and a y direction from the set of coordinates (xn, yn) of interest to the surrounding sets of coordinates. In Equation (1), fx, fy indicate ranges (ranges where the luminance values are reflected) of sets of coordinates to be taken into consideration from the set of coordinates of interest. σd is a weighting coefficient of the distance. σS is a weighting coefficient of the corrective sharpnesses. The corrective sharpnesses is assumed to be normalized to a value of 0 to 1. M(x, y) is the numbers of the image reference values A and the corrective sharpnesses S (fixed at "2" in the first embodiment) adopted in the designated pixel.

Equation (1) means that each of a weighting amount of the distance and a weighting amount of the corrective sharpnesses is expressed by a Gaussian coefficient and those weighting amounts are multiplied. That is, the luminance value calculator b4 calculates the luminance value V of each set of coordinates of the all-in-focus image by reflecting the luminance values of the surrounding sets of coordinates on the luminance value of the set of coordinates of interest by weighting corresponding to the distance and the corrective sharpnesses. In more particular, for each set of coordinates, the luminance value calculator b4 first refers to the luminance value of this set of coordinates of the captured image CI indicated by the image reference value A. Then, the luminance values of the captured image CI indicated by the image reference values A of the surrounding sets of coordinates are reflected on that luminance value. At that time, the set of coordinates at a shorter distance from the set of coordinates of interest influence the luminance value more. Further, as the corrective sharpnesses becomes higher, the luminance value is more influenced.

Thereafter, the all-in-focus image generator b5 of the arithmetic processor 141 generates an all-in-focus image by combining the luminance values V calculated for each set of coordinates (Step ST9). In this way, as shown in the right-lower part of FIG. 3, the missing of the overlapping part of the cells C1, C2 and the like do not appear in the all-in-focus image AI generated based on the five captured images CI0 to CI4 and the both cells C1, C2 appear in a state with less blur.

As described above, M (two in this embodiment) corrective sharpnesses S and M image reference values A are obtained for each pixel and the all-in-focus image AI is generated based on these. Thus, in this all-in-focus image AI, the cells C present at positions (heights) mutually different in the vertical direction (height direction) are respectively vividly reflected. As a result, even if the plurality of cells C are distributed in a complicated manner in the well 91, each cell C can be clearly confirmed.

As described above, in the first embodiment, a step of obtaining the five captured images CI0 to CI4 as shown in the upper part of FIG. 3 corresponds to an example of a step (a) of the invention. Further, Step ST2 of FIG. 5 corresponds to a step (b-1) of the invention, Steps ST3 to ST7 correspond to an example of a step (b-2) of the invention, and Steps ST2 to ST7 correspond to an example of a step (b) of the invention. Further, Steps ST8, ST9 of FIG. 5 respectively correspond to examples of steps (c), (d) of the invention.

Note that the invention is not limited to the embodiment described above and various changes other than the aforementioned ones can be made without departing from the gist of the invention. For example, in the first embodiment, top two significant corrective sharpnesses S(0, x, y), S(1, x, y) are calculated from the extracted five individual sharpnesses S0 to S4 and the image reference values A(0, x, y), A(1, x, y) are uniquely determined for each pixel. In contrast, in a second embodiment of the image processing apparatus according to the invention, the setting of the corrective sharpness s(1, x, y) and the image reference value A(1, x, y) is partially changed as described next.

Figure 8A:
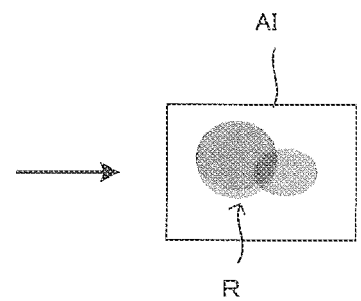
FIGS. 8A and 8B are charts showing an image processing method performed in the second embodiment of the image processing apparatus according to the invention.
Figure 8B:
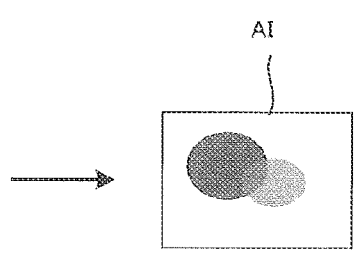

FIGS. 8A and 8B are charts showing an image processing method performed in the second embodiment of the image processing apparatus according to the invention. For example, if the next most significant image reference value A(1, x, y) is adjacent to the image reference value A(0, x, y) at the same set of coordinates as indicated by circles in FIG. 8A, an image of a cell C may be blurred as indicated by R in FIG. 8A upon a slight displacement in the height direction from a height at which one cell C is focused. Accordingly, to effectively avoid this, a next most significant (third most significant) image reference value A may be set as the image reference value A(1, x, y) as shown in FIG. 8B. For example, if the individual sharpnesses shown in FIG. 7 are already calculated, a corrective sharpness s(1, 1, 2) of a set of coordinates (1, 2) at which an image is blurred due to the above adjacent condition, may be set at a value "50" of the third most significant individual sharpness and the image reference value A(1, x, y) may be changed from "1" to "4" as encircled with thick frames in FIG. 8B. By so doing, a vivid all-in-focus image AI with no blur is obtained as shown in FIG. 8B.

Further, in the first embodiment, the top M individual sharpnesses are adopted as the corrective sharpnesses regardless of the values of the individual sharpnesses and the M image reference values A are determined. Here, a predetermined threshold value may be set as an adoption standard of the corrective sharpness s(third embodiment).

Figure 9:
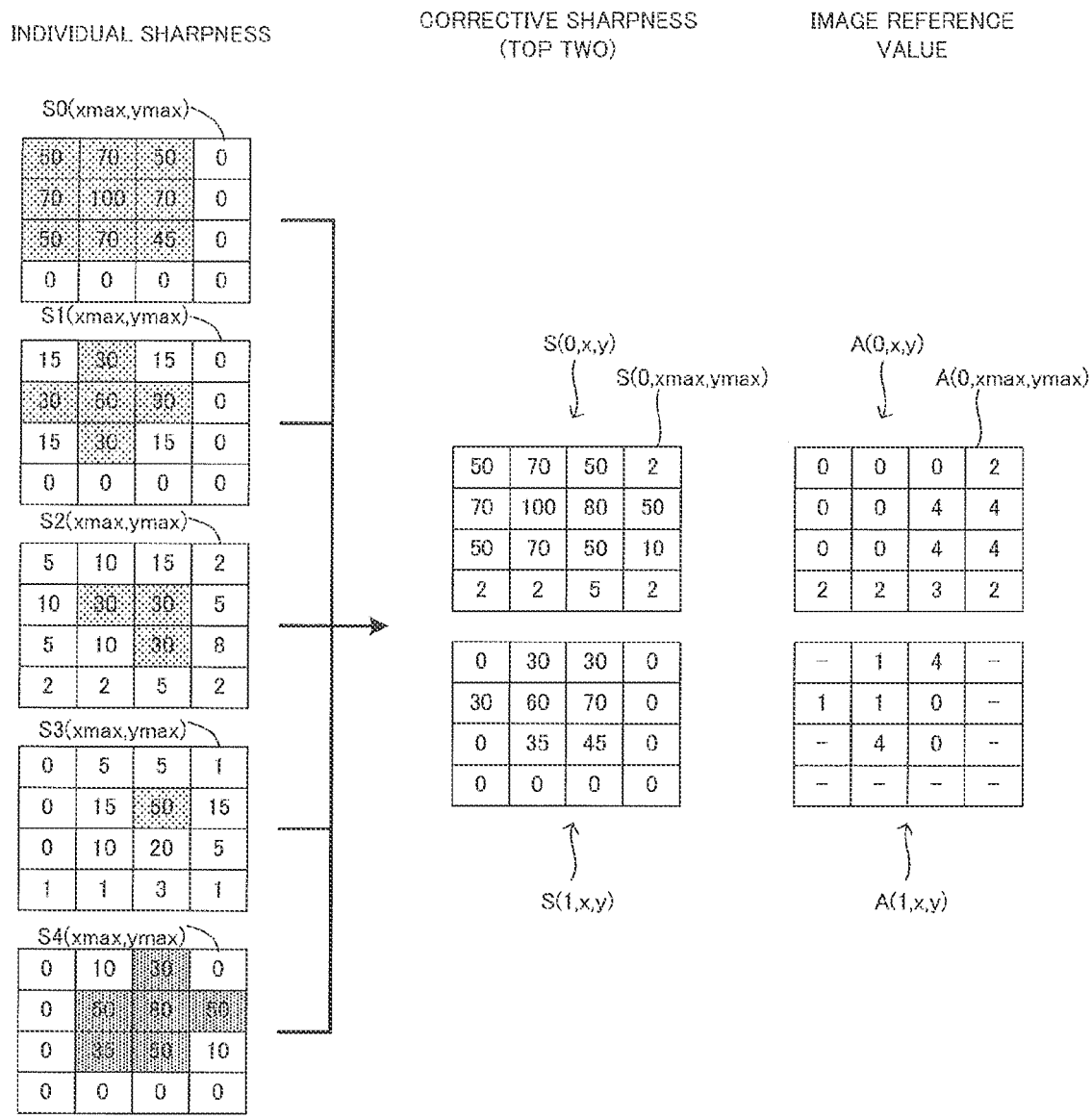
FIG. 9 is a chart showing an image processing method performed in the third embodiment of the image processing apparatus of the invention.

FIG. 9 is a chart showing an image processing method performed in the third embodiment of the image processing apparatus of the invention. In this third embodiment, individual sharpnesses S0 to S4 are calculated as in the first embodiment. On the other hand, in Step ST3, the corrective sharpness calculator b2 extracts individual sharpnesses S0(xm, yn), S1(xm, yn), S2(xm, yn), S3(xm, yn) and S(xm, yn) corresponding to a pixel (xm, yn) from all the individual sharpnesses calculated in Step ST3. Subsequent to that, the corrective sharpness calculator b2 determines the most significant sharpness equal to or larger than a predetermined threshold value (e.g. "30"), out of the extracted individual sharpnesses S0(xm, yn) to S4(xm, yn), as a corrective sharpness s(0, xm, yn) (Step ST4). Subsequent to that, the image reference value determiner b3 determines an image reference value A(0, xm, yn) corresponding to the most significant corrective sharpness s(0, xm, yn) (Step ST5).

As just described, since the threshold value condition is added in the third embodiment, any of the extracted individual sharpnesses S0(xm, yn) to S4(xm, yn) may not exceed the threshold value depending on the pixel, for example, as shown in FIG. 9. Accordingly, in this embodiment, a maximum value of the individual sharpnesses S0(xm, yn) to S4(xm, yn) is exceptionally determined as the corrective sharpness s(0, xm, yn) and the image reference value A(0, xm, yn) corresponding thereto is determined (Step ST5). For example, since individual sharpnesses S0 to S4 of a pixel (xmax, ymax) in FIG. 9 are:

$S0(xmax, ymax)=0$, $S1(xmax, ymax)=0$, $S2(xmax, ymax)=2$, $S3(xmax, ymax)=1$, and $S4(xmax, ymax)=0$, the corrective sharpness calculator b2 sets the corrective sharpness s(0, xmax, ymax) to "2" and the image reference value determiner b3 sets the image reference value A(0, xmax, ymax) to "2".

Further, the corrective sharpness calculator b2 calculates the corrective sharpness s(1, xm, yn) that satisfies the above threshold value condition and is next most significant (Step ST6). Further, the image reference value determiner b3 determines an image reference value A(1, xm, yn) corresponding to the corrective sharpness s(1, xm, yn) (Step ST7). Here, for the pixels not satisfying the threshold value condition, the exception is provided in the most significant corrective sharpness s(0, xm, yn), but the corrective sharpness s(1, xm, yn) is set to "0" and "no" image reference value A(1, xm, yn) is set in the next most significant corrective sharpness s(1, xm, yn) as shown in FIG. 9 to exclude such pixels from objects of luminance calculation (Step ST8). That is, the number of the corrective sharpnesses S and the number of the image reference values A can be changed to 1 or M for each pixel. Thus, the following functions and effects are obtained.

In the first and second embodiments, the number M of the image reference values A for each pixel is fixed and those image reference values A are used for the calculation of the luminance value V even if the sharpness is weak. This may become a factor for including a blur region in the all-in-focus image AI. In contrast, in the third embodiment, the number M is made variable and the image reference value is excluded from the calculation of the luminance value V for the weak sharpness. Thus, a more vivid all-in-focus image AI can be generated by suppressing the inclusion of the blur region in the all-in-focus image AI.

Further, although the predetermined threshold value of "30" is set in advance in the third embodiment, a threshold value may be set on the basis of a maximum value of the individual sharpnesses S0 to S4 (fourth embodiment).

Figure 10:
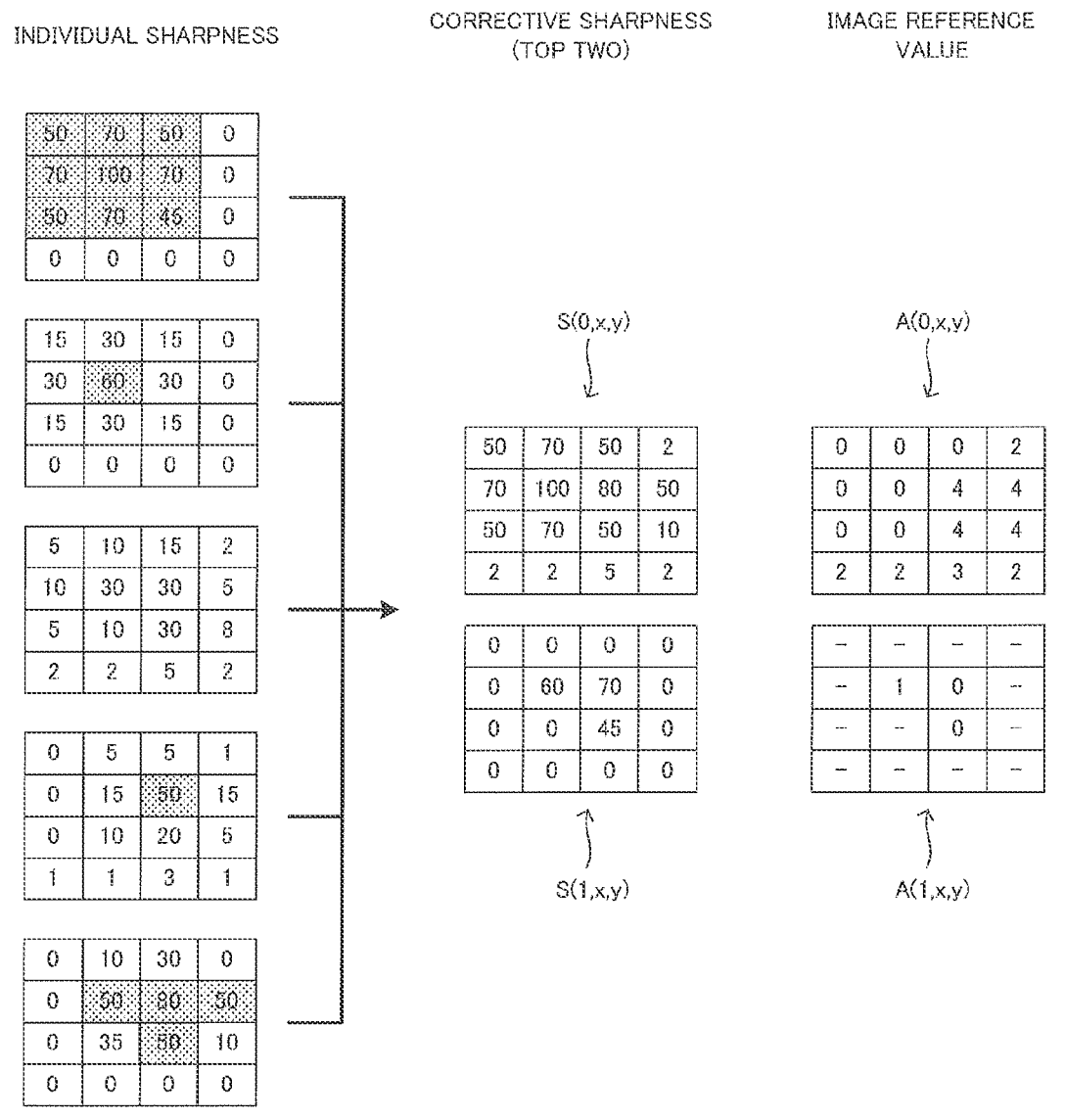

FIG. 10 is a chart showing an image processing method performed in the fourth embodiment of the image processing apparatus of the invention. This fourth embodiment largely differs from the third embodiment in including a step of obtaining a maximum value of all the individual sharpnesses calculated in Step ST2 and setting a value obtained by multiplying that maximum value by a coefficient (e.g. 0.4) as the threshold value before Steps ST3 to ST7 are performed. When the setting of this threshold value is completed, an all-in-focus image AI is generated thereafter in the same manner as in the third embodiment. As just described, also in the fourth embodiment, a more vivid all-in-focus image AI can be generated by suppressing the inclusion of a blur region into the all-in-focus image AI as in the third embodiment.

Further, in the above embodiments, five captured images CI0 to CI4 are obtained by imaging an object while the focus position is changed in five stages along the optical axis. That is, N=5. This value N is not limited to 5 and may be 2 to 4 or 6 or more.

Further, although the luminance value V is calculated by the above Equation (1), another formula may be used instead of Equation (1). A formula may be any formula for reflecting luminance values of a captured image indicated by image reference values A of surrounding sets of coordinates on a luminance value of the captured image indicated by an image reference value A of each set of coordinates.

Further, in the above embodiments, one field of view is set for one well 91 and imaging is performed with the focus position changed in this field of view. However, one well 91 may be divided into a plurality of fields of view and a plurality of captured images may be obtained for each field of view while the imager 13 is moved between the respective fields of view. In that case, the imaging process may be performed for each field of view to generate an all-in-focus image and the obtained all-in-focus images may be composited (tiled) to generate an image of one well 91.

Further, in the above embodiments, the cells C to be imaged are held in the plurality of wells 91 of the well plate 9. However, the cells C may be held in a container other than the well plate 9.

Further, in the above embodiments, single cells C are an object to be imaged. However, the object to be imaged may be a spheroid as a three-dimensional aggregate of a plurality of cells. Further, the object to be imaged may be a specimen other than cells.

Further, in the above embodiments, the illuminator 12 is arranged above the object to be imaged and the imager 13 is arranged below the object to be imaged. However, the illuminator 12 may be arranged below the object to be imaged and the imager 13 may be arranged above the object to be imaged.

Further, in the above embodiments, the focus position of the imager 13 is changed by moving some optical components included in the optical system of the imager 13. However, the focus position of the imager 13 in the well 91 may be changed along the optical axis by elevating or lowering the entire imager 13. Further, the focus position of the imager 13 with respect to the container may be relatively changed by elevating or lowering the container holding the object to be imaged. That is, a "moving mechanism" in the invention may be a mechanism for moving the entire imager 13 or a mechanism for moving the container (well plate 9).

Further, in the above embodiments, the position of the container holding the cells C is fixed and the illuminator 12 and the imager 13 are moved in the horizontal direction. However, the container may be moved in the horizontal direction with the positions of the illuminator 12 and the imager 13 fixed.

This invention can be applied to an image processing technique for generating an all-in-focus image based on a plurality of captured images and imaging apparatuses in general using this image processing technique.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image processing method for generating an all-in-focus image based on a plurality of captured images, comprising:
   (a) obtaining N captured images each constituted by a plurality of pixels by imaging an object while a focus position is changed in N stages along an optical axis, wherein N is a natural number equal to or greater than 2;
   (b) obtaining M image reference values and corrective sharpness for each pixel, the image reference value being a number of the captured image to be referred to as a luminance value of each set of coordinates of the all-in-focus image, wherein M is a natural number equal to or greater than 2 and smaller than N;
   (c) calculating the luminance value based on the image reference values and the corrective sharpness for each set of coordinates; and
   (d) generating the all-in-focus image by combining the calculated luminance values,
   wherein the operation (b) includes:

(b-1) obtaining N individual sharpnesses by calculating a sharpness at each focus position; and (b-2) obtaining the corrective sharpness and the image reference value from the N individual sharpnesses, wherein top M significant ones of the N individual sharpnesses are extracted as the corrective sharpness and numbers of the captured images respectively corresponding to the M extracted corrective sharpness are set as the M image reference values for each pixel in the operation (b-2).

2. The image processing method according to claim 1, wherein:

the operation (b-2) includes obtaining the M corrective sharpnesses and the M image reference values from the N individual sharpnesses for each pixel.

3. The image processing method according to claim 1, wherein:

the corrective sharpnesses and the image reference values are obtained from the most significant individual sharpness and the next most significant individual sharpness having a sharpness equal to or more than a threshold value, out of the N individual sharpnesses, for each pixel in the operation (b-2).

4. The image processing method according to claim 3, wherein:

a value obtained by multiplying a maximum value of all the individual sharpnesses by a certain coefficient is set as the threshold value.

5. An image processing apparatus for generating an all-in-focus image based on a plurality of captured images, comprising:

an image storage configured to store captured images each constituted by a plurality of pixels and obtained by imaging an object while changing a focus position in N stages along an optical axis, wherein N is a natural number equal to or greater than 2;

a sharpness calculator configured to calculate N individual sharpnesses by calculating a sharpness at each focus position and calculating M corrective sharpnesses from the N individual sharpnesses, wherein M is a natural number equal to or greater than 2 and smaller than N;

an image reference value determiner configured to determine an image reference value in correspondence with the corrective sharpness, the image reference value being a number of the captured image to be referred to as a luminance value of each set of coordinates of the all-in-focus image;

a luminance value calculator configured to calculate the luminance value based on the image reference value and the corrective sharpness for each set of coordinates; and an all-in-focus image generator configured to generate the all-in-focus image by combining the calculated luminance values, wherein the sharpness calculator obtains N individual sharpnesses by calculating a sharpness at each focus position, and obtains the corrective sharpness and the image reference value from the N individual sharpnesses, and wherein top M significant ones of the N individual sharpnesses are extracted as the corrective sharpness and numbers of the captured images respectively corresponding to the M extracted corrective sharpness are set as the M image reference values for each pixel when obtaining the corrective sharpness and the image reference value from the N individual sharpnesses.

6. An imaging apparatus, comprising:

the image processing apparatus according to claim 5;

an imager configured to image the object;

an illuminator configured to emit light toward the object; and a moving mechanism configured to change the focus position of the imager along the optical axis.

7. The image processing method according to claim 1, wherein, pixels having less than M individual sharpnesses satisfying the predetermined threshold, the top one but less than M individual sharpnesses among the individual sharpnesses satisfying the predetermined threshold are adopted as the correction sharpnesses in the step (b) while pixels having M or more individual sharpnesses satisfying the predetermined threshold, the top M individual sharpnesses among the individual sharpnesses satisfying the predetermined threshold are adopted as the correction sharpnesses in the step (b).

* * * * *